(12) United States Patent
Shinkai (10) Patent No.: US 10,912,152 B2
(45) Date of Patent: Feb. 2, 2021

(54) PHOTOGRAPHING APPARATUS FOR VEHICLE AND HEATING DEVICE

(71) Applicant: TOYOTA JIDOSHA KABUSHIKI KAISHA, Toyota (JP)

(72) Inventor: Ryuichi Shinkai, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 16/055,434

(22) Filed: Aug. 6, 2018

(65) Prior Publication Data

US 2019/0200416 A1 Jun. 27, 2019

(30) Foreign Application Priority Data

Dec. 27, 2017 (JP) ................. 2017-250542

(51) Int. Cl.
| | |
|---|---|
| *H05B 1/02* | (2006.01) |
| *H05B 3/84* | (2006.01) |
| *H05B 3/06* | (2006.01) |
| *G03B 17/55* | (2021.01) |
| *B60R 11/04* | (2006.01) |
| *G02B 7/02* | (2021.01) |
| *B60R 11/00* | (2006.01) |

(52) U.S. Cl.
CPC .......... *H05B 1/0236* (2013.01); *B60R 11/04* (2013.01); *G02B 7/028* (2013.01); *G03B 17/55* (2013.01); *H05B 3/06* (2013.01); *H05B 3/84* (2013.01); *B60R 2011/0026* (2013.01); *B60R 2011/0063* (2013.01)

(58) Field of Classification Search
CPC ...... H05B 1/0236; H05B 3/0042; H05B 1/26; H05B 3/84; H05B 3/06; G60R 11/04; G60R 2011/0026; G02B 7/028; G02B 17/55
USPC ....... 219/203, 213, 536, 539, 541, 544, 216, 219/505, 494
See application file for complete search history.

(56) References Cited

U.S. PATENT DOCUMENTS

| | | | | |
|---|---|---|---|---|
| 7,731,373 | B2 * | 6/2010 | Oskarsson | B60S 1/026 359/512 |
| 9,395,538 | B2 * | 7/2016 | Hui | H04N 5/2251 |
| 9,503,619 | B2 * | 11/2016 | Hacker | B60J 1/002 |
| 9,913,319 | B2 * | 3/2018 | Timmermann | H05B 3/10 |

(Continued)

FOREIGN PATENT DOCUMENTS

| | | |
|---|---|---|
| JP | 2017-185896 A | 10/2017 |
| JP | 2017-206098 A | 11/2017 |

*Primary Examiner* — Mark H Paschall
(74) *Attorney, Agent, or Firm* — Sughrue Mion, PLLC (57) ABSTRACT

A photographing apparatus for vehicle includes a photographing apparatus receiving photographing light passing through a window, a heater that is a heating wire generating heat when receiving electricity, a heated portion to which the heater is fixed, and a pair of electrical supply lines that is connected to both end portions of the heater respectively and supply the electricity to the heater. The heated portion releases radiation heat to the window when receiving heat from the heater. An amount of heat generated by the both end portions per unit time is smaller than an amount of heat generated by the heater's portion other than the both end portions. The both end portions of the heater are positioned on outer peripheral side with respect to the heated portion when viewed in a thickness direction of the heated portion.

2 Claims, 8 Drawing Sheets

(56) References Cited

U.S. PATENT DOCUMENTS

| | | | |
|---|---|---|---|
| 10,479,287 B2* | 11/2019 | Sliwa | B60S 1/02 |
| 2011/0233248 A1* | 9/2011 | Flemming | B60R 11/02 |
| | | | 224/482 |
| 2015/0034621 A1 | 2/2015 | Timmermann et al. | |
| 2016/0119509 A1 | 4/2016 | Wato | |
| 2017/0295610 A1 | 10/2017 | Usami et al. | |
| 2017/0334364 A1 | 11/2017 | Usami et al. | |

* cited by examiner

PHOTOGRAPHING APPARATUS FOR VEHICLE AND HEATING DEVICE

BACKGROUND OF THE INVENTION

1. Field of the Invention

The present invention relates to a photographing apparatus for vehicle and a heating device which are, for example, provided behind a front window of a vehicle.

2. Description of the Related Art

A camera may be provided behind a front window of a vehicle. The camera converts reflected light (object image) reflected by an object (for example, a vehicle) positioned in front of the vehicle into imaging data (electric signal) by an image pickup device, and transmits the imaging data to a control device of the vehicle.

Incidentally, at low outside air temperature (i.e., temperature outside of the vehicle), when an air heating device is used inside the vehicle, dew condensation may be generated on the front window. Further, when the outside air temperature is low, ice and/or frost may adhere on the outer surface of the front window. When such a phenomenon occurs on the front window, an imaging data produced by the image pickup device of the camera may be data indicating a blurred object image, or the image pickup device may fail to capture an object in front of the vehicle.

Thus, a heater being a heating wire and a heated portion, to which the heater is fixed and gives heat received from the heater to the front window as radiation heat, are provided behind the front window of the vehicle (i.e., provided inside the vehicle) disclosed in Japanese Unexamined Patent Application Publication No. 2017-185896. One end of each of a pair of electrical supply lines constituting a part of an electrical circuit is soldered to both end portions of the heater, respectively.

This heater is connected to an electric power source of the vehicle via the electrical supply lines. When the electric power of the electric power source is supplied to the heater, the heater generates heat. The heated portion is heated by the heat generated by the heater, and the radiation heat generated by the heated portion is given to the front window. When the temperature of the heater becomes a value within a predetermined temperature range, the temperature of the front window becomes equal to or higher than the dew point temperature. As a result, the dew condensation occurring on the front window disappears. Furthermore, ice and frost adhering to the outside surface of the front window disappear.

Therefore, when the front window is heated by the heater and the heated portion, the risk that the image pickup device captures a blurred object image or fails to capture an obstacle can be reduced.

SUMMARY OF THE INVENTION

In Japanese Unexamined Patent Application Publication No. 2017-185896, the entire heater faces the heated portion in the thickness direction of the heated portion when viewed in the thickness direction. When viewed in the thickness direction of the heated portion, the both end portions of the heater face the outer peripheral portion of the heated portion in the thickness direction.

The both end portions of the heater, which are connected to the ends of the pair of electrical supply lines by solder respectively, do not substantially generate heat when electric power is supplied to the heater. Further, the both end portions of the heater, which face the outer peripheral portion of the heated portion in the thickness direction, are easier to dissipate heat than a portion of the heater which faces the central portion of the heated portion in the thickness direction.

Therefore, the both end portions of the heater (solders) tend to be lower in temperature than other portions of the heater. In other words, the amount of heat generated by the portions of the heated portion, which face the both end portions of the heater, is smaller than the amount of heat generated by portions of the heated portion, which face the heater's portions other than the both end portions. Therefore, the heated portion cannot uniformly generate radiation heat. That is, in Japanese Unexamined Patent Application Publication No. 2017-185896, dew condensation, ice, and frost occurring on the front window may fail to be efficiently removed by the radiation heat generated by the heated portion.

The present invention has been made in order to cope with the above-mentioned problem. That is, the present invention has an object to provide a photographing apparatus for vehicle and a heating device having a heated portion capable of uniformly generating radiation heat.

A photographing apparatus for vehicle (10) according to the present invention comprises:

a photographing apparatus (30) that is disposed inside a vehicle so as to face a window (85) of the vehicle and is configured to receive photographing light passing through the window;

a heater (43b) that is disposed inside the vehicle so as to face the window and is a heating wire generating heat when receiving electricity of an electric power source;

a heated portion (41a) to which the heater is fixed, the heated portion releasing radiation heat to the window when receiving heat from the heater; and a pair of electrical supply lines (44c, 63), connected to both end portions of the heater respectively, supplying the electricity of the electric power source to the heater.

An amount of heat generated by the both end portions per unit time is smaller than an amount of heat generated by the heater's portion (43b1) other than the both end portions.

The both end portions of the heater are positioned on outer peripheral side with respect to the heated portion when viewed in a thickness direction of the heated portion.

A heating device (95) according to the present invention, which is disposed inside a vehicle so as to face a window (85) of the vehicle together with a photographing apparatus (30), the heating device comprises:

a heater (43b), being a heating wire, generating heat when receiving electricity of an electric power source;

a heated portion (41a) to which the heater is fixed the heated portion releasing radiation heat to an area surrounding the heater when receiving heat from the heater; and a pair of electrical supply lines (44c, 63), connected to both end portions of the heater respectively, supplying the electricity of the electric power source to the heater.

An amount of heat generated by the both end portions per unit time is smaller than an amount of heat generated by the heater's portion (43b1) other than the both end portions.

The both end portions of the heater are positioned on outer peripheral side with respect to the heated portion when viewed in a thickness direction of the heated portion.

In the present invention, the both end portions of the heater are positioned on the outer peripheral side with respect to the heated portion when viewed in the thickness direction of the heated portion. The heater generates heat when electric power is supplied thereto, however, the amount of heat generated by the both end portions per unit time is smaller than the amount of heat generated by the heater's portions other than the both end portions. Therefore, when the heater's portions other than the both end portions face the entire heated portion, the heated portion can uniformly generate radiation heat.

In the above description, references used in the following descriptions regarding embodiments are added with parentheses to the elements of the present invention, in order to understand the invention. However, those references should not be used to limit the scope of the present invention. Other objects, other features, and accompanying advantages of the present invention are easily understood from the description of embodiments of the present invention to be given referring to the following drawings.

BRIEF DESCRIPTION OF THE DRAWINGS

FIG. 6 is a perspective view of the light shielding and heating unit as viewed from the below.

DETAILED DESCRIPTION OF THE PREFERRED EMBODIMENTS

Hereinafter, a photographing apparatus for vehicle (including a heating device) according to an embodiment of the present invention will be described with reference to the accompanying drawings.

(Configuration)

Figure 1:
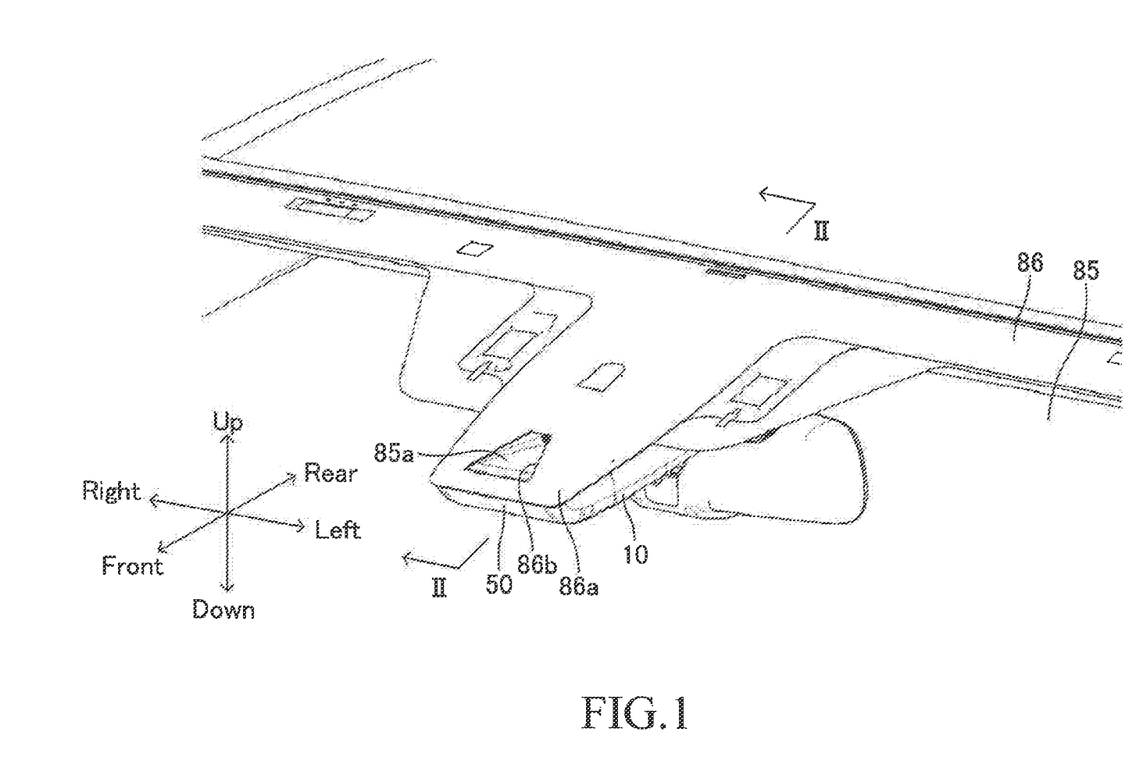
FIG. 1 is a perspective view of a photographing apparatus for vehicle and a front window according to an embodiment of the present invention as viewed from the front.
Figure 2:
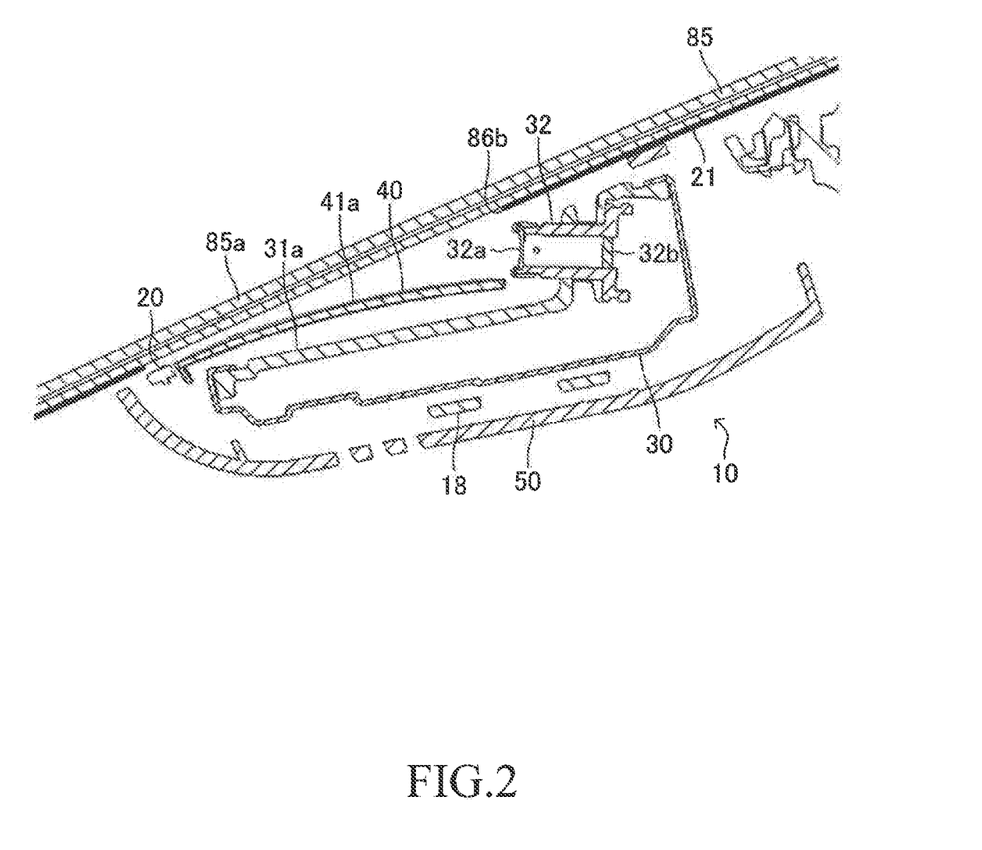
FIG. 2 is a cross-sectional view taken along line in FIG. 1.

As shown in FIG. 1, a photographing apparatus for vehicle 10 (hereinafter referred to as a "photographing apparatus 10") according to the embodiment is provided behind a front window 85 of a vehicle (i.e., provided inside the vehicle). The front window 85 is made from translucent glass. The front window 85 may be made from a material (for example, resin) other than glass as long as it has translucency. As shown in FIG. 2, the front window 85 is inclined with respect to the vehicle body in such a manner that the front window 85 gradually heads toward the front of the vehicle as approaching the lower end thereof from the upper end thereof.

As shown in FIG. 1, a light shielding sheet 86 having a substantially T-shape in its entire shape is attached to an upper edge portion and its vicinity of the rear surface (that is, a surface on the vehicle interior side) of the front window 85. At the central portion of the light shielding sheet 86, a forward extending portion 86a extending forward and obliquely downward is formed. A light transmission hole 86b having a substantially trapezoidal shape is formed in the vicinity of the front end of the forward extending portion 86a. A portion of the front window 85 facing the light transmission hole 86b is a light transmission portion 85a. The photographing apparatus 10 is provided behind the front window 85 (i.e., inside the vehicle) so as to face the light transmission portion 85a.

Figure 3:
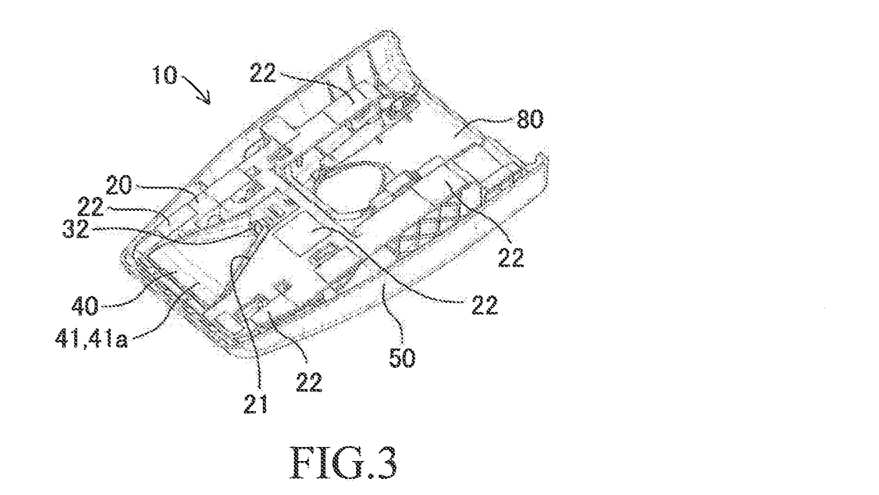
FIG. 3 is a perspective view of the photographing apparatus for vehicle as viewed from the above.
Figure 4:
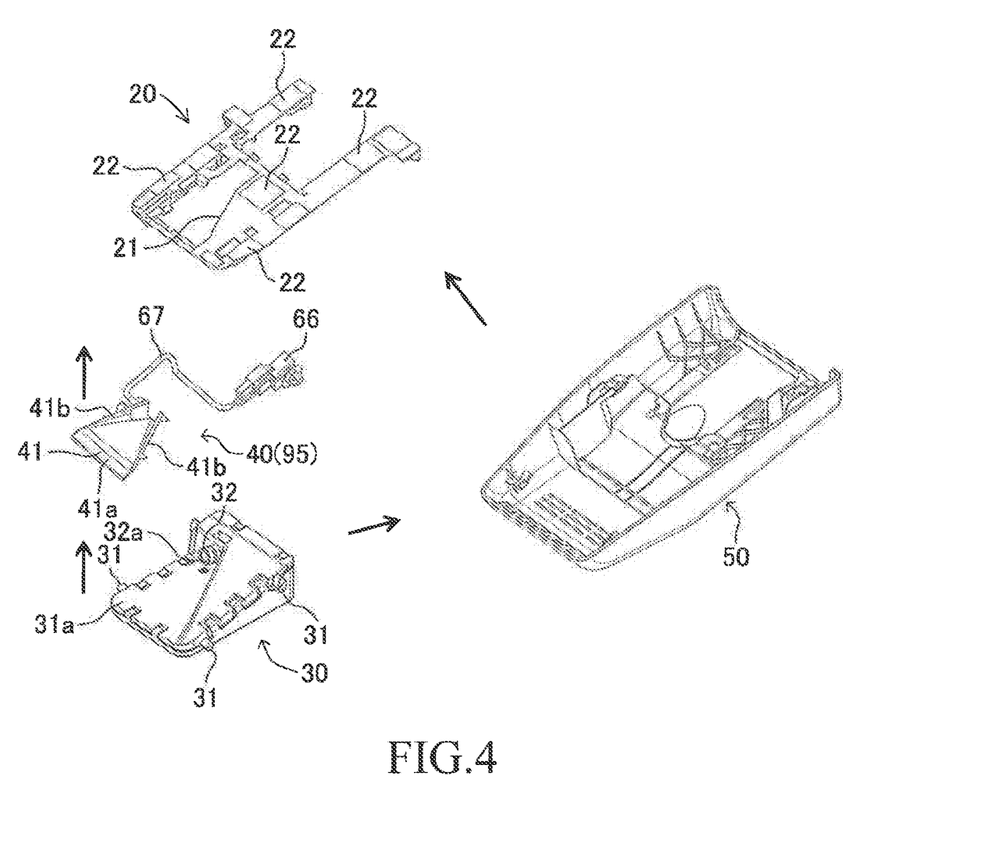
FIG. 4 is an exploded perspective view of the photographing apparatus for vehicle viewed from the above.

As shown in FIGS. 3 and 4, the photographing apparatus 10 includes a bracket 20, a camera unit 30, a light shielding and heating unit 40, and a cover 50 as main components.

The bracket 20 is made from a hard resin. A support portion 21, which is substantially trapezoidal through hole, is formed in the bracket 20. Further, a plurality of adhesive surfaces 22 are formed on the upper surface of the bracket 20.

The camera unit 30 includes a housing 31 and an image pickup unit 32. The housing 31 is an integrally molded product made from resin and constitutes the outer shape of the camera unit 30. A hood mounting recess 31a having a substantially trapezoid shape in a plan view is formed on the upper surface of the housing 31. The image pickup unit 32 is fixed to the rear end surface of the hood mounting recess 31a. As shown in FIG. 2, the image pickup unit 32 includes a lens 32a and an image pickup device 32b positioned immediately behind the lens 32a. The image pickup device 32b is a compound eye type device. The image pickup device 32b receives reflected light (photographing light), which is reflected backward by an obstacle located in front of the camera unit 30 and passes through the lens 32a. The upper portion of the camera unit 30 is engaged with the bracket 20 and is supported by the bracket 20.

The light shielding and heating unit 40 shown in FIGS. 4 to 8 (particularly, FIG. 5) is provided with a light shielding hood 41, a double-faced adhesive tape 42, a heater module 43, a fuse module 44, a heat insulator 45 and a cable module 46 as main components.

The light shielding hood 41 is an integrally molded product made from a hard resin. The light shielding hood 41 includes a heated portion 41a and side wall portions 41b. The heated portion 41a is a plate having an equilateral triangular shape (that is, the heated portion 41a has an equilateral triangular shape in the front view). The side wall portions 41b are a pair of flange portions extending upward from left and right side edge portions of the heated portion 41a, respectively. The height of each side wall portion 41b gradually increases from the front end thereof toward the rear end thereof.

The heater module 43 includes a PET sheet 43a and a heater 43b.

The PET sheet 43a is made from PET (polyethylene terephthalate). The PET sheet 43a includes a body portion 43a1 having substantially the same shape as the heated portion 41a and a substantially rectangular supported portion 43a2 projecting to the left side from the left side edge portion of the body portion 43a1. The PET sheet 43a has good insulating property.

The heater 43b is a heating wire made from a metal (for example, brass) that generates heat when receiving electricity. The heater 43b is formed on the substantially entire upper surface of the PET sheet 43a by printing. Both end portions of the heater 43b are a pair of lands 43c, 43d. Each of the lands 43c, 43d has a width broader than a width of a body portion 43b1 which is the other portion of the heater 43b (i.e., each of the lands 43c, 43d has an area per unit length which is larger than that of the body portion 43b1) and is formed in the supported portion 43a2. Further, portions of the lands 43c, 43d are connecting portions 43c1, 43d1 exposed on the upper and lower surfaces of the supported portion 43a2. Further, a land 43e different from the lands 43c, 43d is formed on the upper surface of the supported portion 43a2 by printing. A pair of connecting portions 43e1, 43e2, which are exposed on the upper and lower surfaces of the supported portion 43a2, are formed in the land 43e.

The double-faced adhesive tape 42 has substantially the same shape as the PET sheet 43a. That is, the double-faced adhesive tape 42 includes a body portion 42a1 corresponding to the body portion 43a1 and a support portion 42a2 corresponding to the supported portion 43a2. The lower surface of the body portion 42a1 is attached to the upper surface of the body portion 43a1 of the PET sheet 43a so as to cover the body portion 43b1, and the lower surface of the support portion 42a2 is attached to the upper surface of the supported portion 43a2 so as to cover the lands 43c, 43d, 43e. The upper surface of the body portion 42a1 of the double-faced adhesive tape 42 is attached to the lower surface of the heated portion 41a, and the support portion 42a2 (and the supported portion 43a2) is positioned on the left side with respect to the heated portion 41a (see FIG. 7). As a result, the heater module 43 is fixed to the light shielding hood 41. The double-faced adhesive tape 42 has good thermal conductivity. The peripheral edge portion of the PET sheet 43a overlaps the peripheral edge portion of the double-faced adhesive tape 42.

The fuse module 44 is provided integrally with a double-faced adhesive tape 44a a fuse 44b and two lead wires 44c, 44d.

Figure 5:
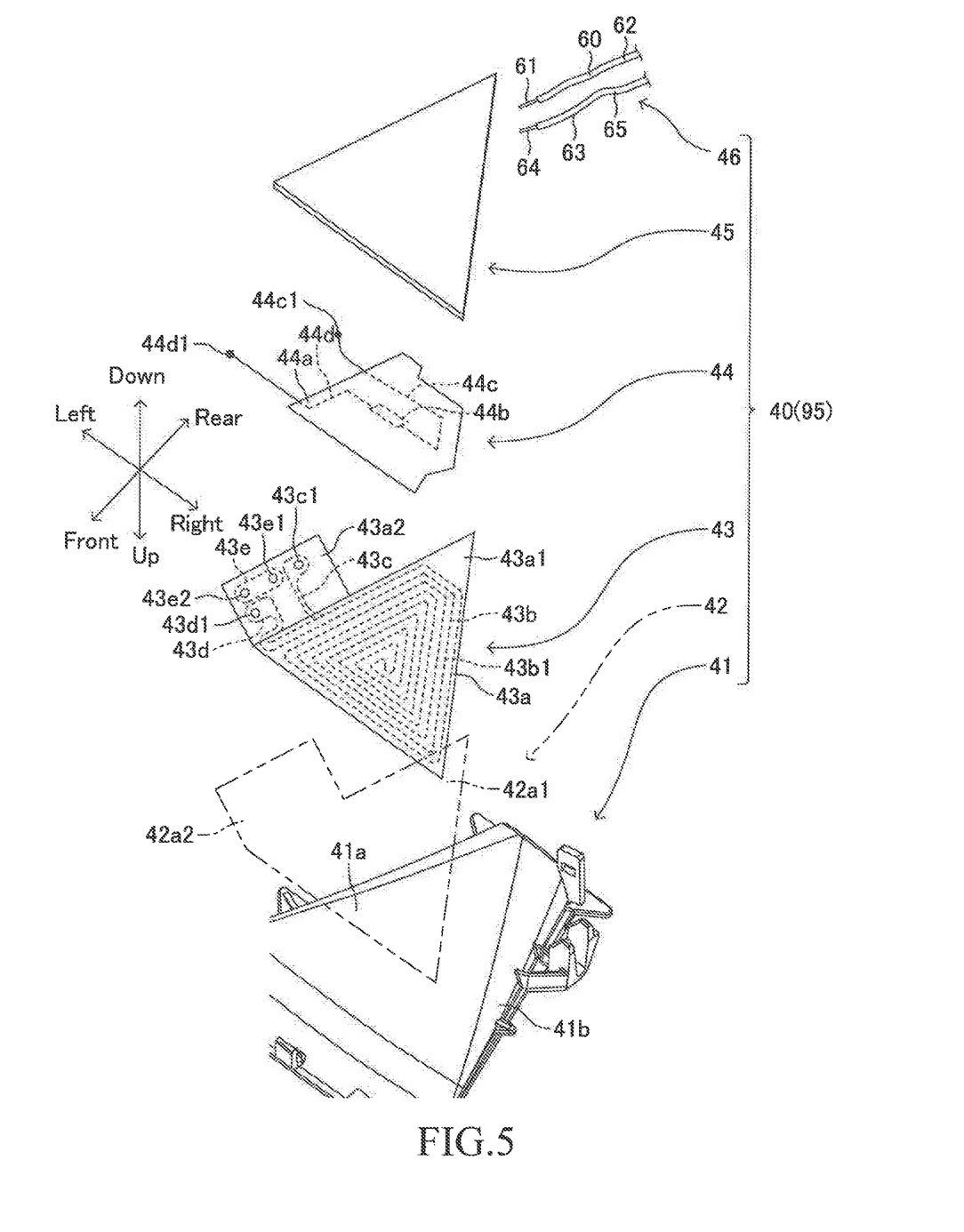

The double-faced adhesive tape 44a is a sheet-like member having a shape shown in FIG. 5, and both surfaces of the double-faced adhesive tape 44a are adhesive surfaces. The thermal conductivity of the double-faced adhesive tape 44a is lower than those of the light shielding hood 41, the double-faced adhesive tape 42, and the PET sheet 43a.

The fuse 44b is a current limiting element, and includes a cylindrical insulating case and a soluble metal which has conductivity. The soluble metal is provided inside the insulating case and is fixed to the insulating case. The insulating case of the fuse 44b is attached to the substantially central portion of the upper surface of the double-faced adhesive tape 44a.

The two lead wires 44c, 44d are attached to the upper surface of the double-faced adhesive tape 44a in the illustrated manner. One end of each of the two lead wires 44c, 44d is located in the insulating case of the fuse 44b. The one end of the lead wire 44c is connected to one end of the soluble metal, and the one end of the lead wire 44d is connected to the other end of the soluble metal. On the other hand, connecting ends 44c1, 44d1, which are the other ends of the two lead wires 44c, 44d, are both located on the outer peripheral side with respect to the double-faced adhesive tape 44a.

Figure 7:
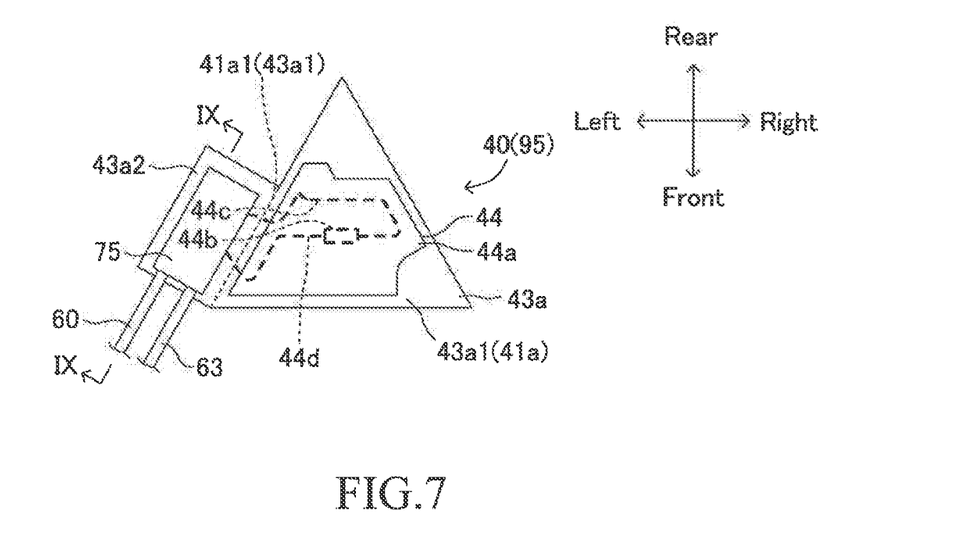
FIG. 7 is a schematic view of a heated portion, a heater module, a fuse module, and a cable module as viewed from the below.
Figure 8:
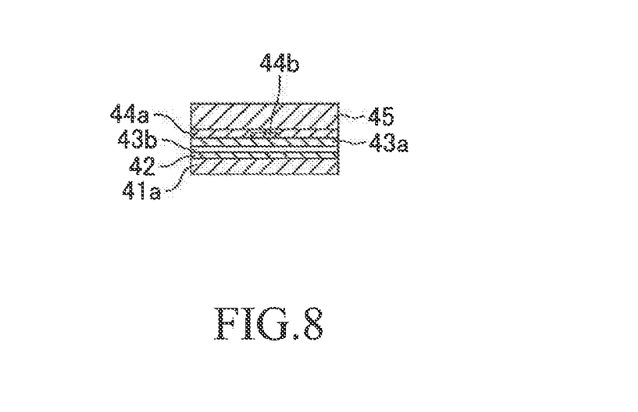
FIG. 8 is a cross-sectional view of the light shielding and heating unit when being cut at a position passing through the fuse.

The upper surface of the double-faced adhesive tape 44a is attached to the lower surface of the body portion 43a1 of the PET sheet 43a. As a result, the fuse module 44 is fixed to the heater module 43. As shown in FIG. 7, the entire fuse module 44 is located on the inner peripheral side with respect to the outer peripheral edge portion of the body portion 43a1 of the PET sheet 43a.

The fuse 44b and the lead wires 44c, 44d (except for the connecting ends 44c1, 44d1) are in contact with the lower surface of the PET sheet 43a. That is, the fuse 44b and the lead wires 44c, 44d (except for the connecting ends 44c1, 44d1) and the body portion 43b1 of the heater 43b are insulated from each other by the PET sheet 43a positioned therebetween.

The heat insulator 45 is made from an insulating material, and has substantially the same shape as the heated portion 41a. That is, the heat insulator 45 is an equilateral triangular sheet-like member. The thermal conductivity of the heat insulator 45 is lower than those of the light shielding hood 41, the double-faced adhesive tape 42, the PET sheet 43a, and the double-faced adhesive tape 44a.

The upper surface of the heat insulator 45 is attached to the lower surface of the double-faced adhesive tape 44a. A portion of the upper surface of the heat insulator 45, which does not face the double-faced adhesive tape 44a, is in contact with the lower surface of the PET sheet 43a. The peripheral portion of the heat insulator 45 is in contact with a portion of the light shielding hood 41 which is positioned on the outer peripheral side with respect to the peripheral portions of the heated portion 41a and the PET sheet 43a.

As shown in FIGS. 5 to 9, the cable module 46 is provided with a first electric cable 60, a second electric cable 63, a connector 66 (see FIGS. 4 and 10) connected to one end of the first electric cable 60 and one end of the second electric cable 63, and a banding tube 67.

The first electric cable 60 includes an electric wire 61 made of a metal wire having good conductivity and a covering tube 62 covering the outer peripheral surface of the electric wire 61 excluding the outer peripheral surface of both end portions thereof. Similarly, the second electric cable 63 includes an electric wire 64 made of a metal wire having good conductivity and a covering tube 65 covering the outer peripheral surface of the electric wire 64 excluding the outer peripheral surface of both end portions thereof.

Two metallic contacts (not shown) are provided inside the connector 66. One of the two contacts is an anode and the other is a cathode. One end of the first electric cable 60 and one end of the second electric cable 63 are connected to the connector 66. One end of the electric wire 61 is connected to one contact which is the anode and one end of the electric wire 64 is connected to the other contact which is the cathode.

Figure 6:
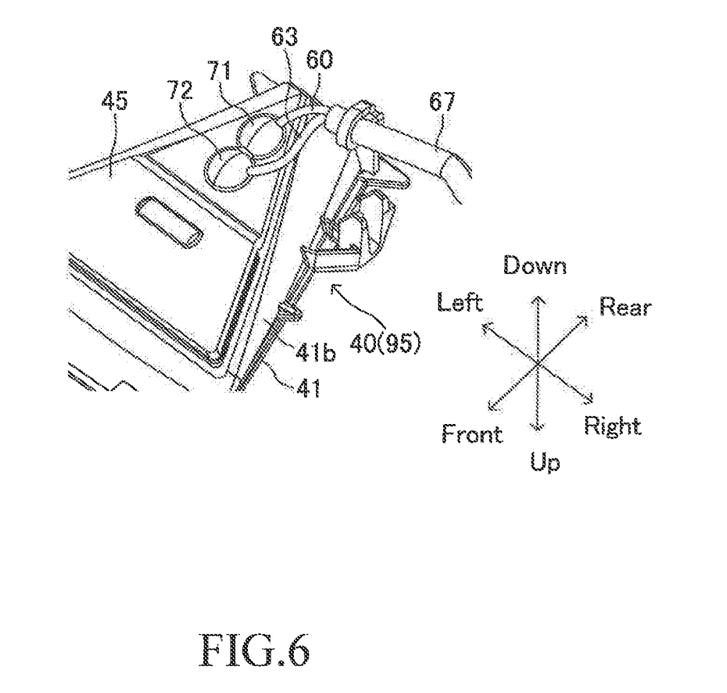
FIG. 6 is an exploded perspective view of a light shielding and heating unit as viewed from the below.

Further, as shown in FIGS. 4 and 6, portions of the covering tube 62 and the covering tube 65, which are different from the front and rear end portions thereof, are inserted into the single banding tube 67. That is, the banding tube 67 bundles the covering tube 62 and the covering tube 65 so as not to separate from each other.

Figure 9:
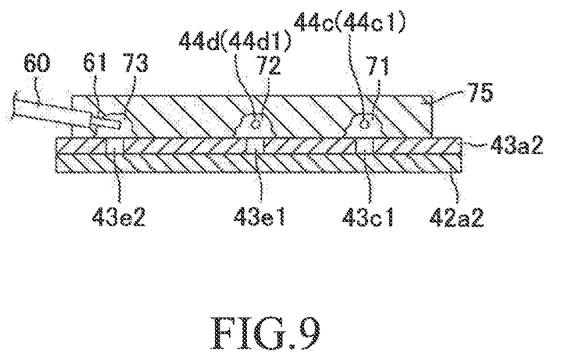
FIG. 9 is a cross-sectional view taken along line IX-IX in FIG. 7.

As shown in FIG. 9, the connecting end 44c1 of the lead wire 44c is connected to the lower surface of the connecting portion 43c1 of the supported portion 43a2 via a solder 71. Further, the connecting end 44d1 of the lead wire 44d is connected to the lower surface of the connecting portion 43e1 via a solder 72. Further, the other end portion of the electric wire 61 of the first electric cable 60 is connected to the lower surface of the connecting portion 43e2 via a solder 73. Although not shown, the other end portion of the electric wire 64 of the second electric cable 63 is connected to the lower surface of the connecting portion 43d1 of the land 43d via a solder. Further, as shown in FIGS. 7 and 9, a substantially rectangular sealant 75 (i.e., sealing member) is fixed to the lower surface of the supported portion 43a2 so as to cover the connecting portions 43c1, 43d1, 43e1, 43e2, the connecting ends 44c1, 44d1, the electric wires 61, 64, and the above solders 71, 72, 73 (including the solder for the connecting portion 43d1).

As shown in FIGS. 3 and 4, the light shielding hood 41 of the light shielding and heating unit 40 is fitted into the hood mounting recess 31a of the camera unit 30, and the front portion of the image pickup unit 32 is located directly above the rear end portion of the heated portion 41a through a gap between the rear end portions of the left and right side wall portions 41b. Further, as shown in FIGS. 2 and 3, the light shielding hood 41 of the light shielding and heating unit 40 is fitted into the support portion 21 of the bracket 20, and the upper surface of the cover 50 is fixed to the bracket 20 so as to cover the camera unit 30 and the light shielding and heating unit 40.

The connector 66 of the cable module 46 is drawn backward of the cover 50 through the rear end opening of the cover 50.

As shown in FIGS. 1 and 2, the photographing apparatus 10, which is integrated in this way, is fixed to the vehicle interior side surface of the forward extending portion 86a of the light shielding sheet 86 by using adhesive (not shown) applied to each adhesive surface 22 of the bracket 20. Then, the support portion 21 of the bracket 20, the heated portion 41a of the light shielding and heating unit 40, and the image pickup unit 32 of the camera unit 30 are positioned at positions facing the light transmission hole 86b of the light shielding sheet 86. Accordingly, photographing light, which is directed from the front side of the front window 85 to the rear side of the front window 85 and passes through the light transmission portion 85a and the light transmission hole 86b of the light shielding sheet 86 backward, is received by the image pickup device 32b after passing through the lens 32a of the image pickup unit 32.

Figure 10:
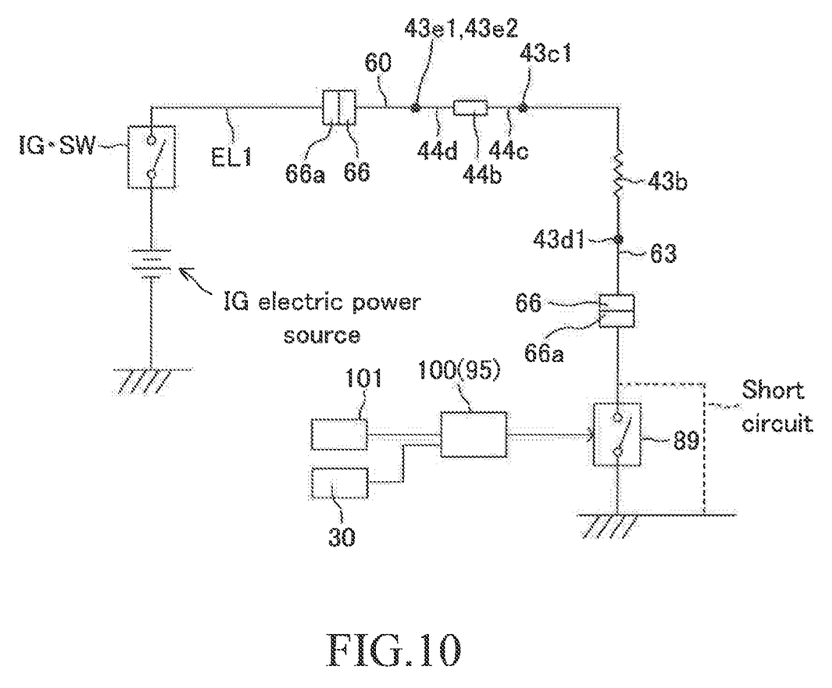
FIG. 10 is a schematic view of an electrical circuit.

As shown in FIG. 10, the vehicle is provide with an electric control device (not shown, hereinafter referred to as "control device") 100. The control device 100 is an ECU. ECU is an abbreviation of Electric Control Unit, and is provided with a microcomputer including a CPU and a storage device such as a ROM and a RAM. The CPU implements various functions by executing instructions (programs) stored in the ROM.

The vehicle is provided with an outside air temperature sensor 101 for measuring air temperature outside the vehicle. Further, the camera unit 30 and the outside air temperature sensor 101 are connected to the control device 100.

As shown in FIG. 10, the connector 66 of the light shielding and heating unit 40 is connected to a vehicle body side connector 66a provided in the vehicle body. Actually, each of the connector 66 and the vehicle body side connector 66a is an integrated member. However, in FIG. 10, the connector 66 and the vehicle body side connector 66a are drawn in a manner that the connector 66 and the vehicle body side connector 66a are divided into two pieces in order to be easy to understand the connection relation.

More specifically, the first electric cable 60 is connected to an anode of a vehicle installation electric power source (i.e., an IG electric power source or battery) via the connector 66, the vehicle body side connector 66a, an electrical supply line EL1, and an ignition switch (IG·SW). A cathode of the IG electric power source is grounded. The second electric cable 63 is connected to one end of a switch element 89 via the connector 66 and the vehicle body side connector 66a. The other end of the switch element 89 is grounded. The state of the switch element 89 is switched between an ON state (i.e., conduction state or connection state) and an OFF state (non-conduction state or disconnection state) by the control device 100. In this embodiment, the switch element 89 is a semiconductor switch element, however, the switch element 89 may be a relay type switch.

The light shielding and heating unit 40 and the control device 100 described above are components of the heating device 95.

(Operation)

Next, the operations of the vehicle and the photographing apparatus 10 will be described. When an ignition key (not shown) is operated, the ignition switch (IG·SW) is closed and thus the anode of the IG electric power source is made to be connected to the electrical supply line EL1. Furthermore, the IG electric power source is made to be connected to the control device 100, the camera unit 30, and the outside air temperature sensor 101 via an electrical supply lines (not shown). As a result, the control device 100 causes the camera unit 30 to start imaging. The camera unit 30 acquires imaging data using the image pickup unit 32 each time a predetermined time period elapses.

More specifically, the image pickup device 32b of the image pickup unit 32 captures reflected light, which is reflected backward by an object (for example, another vehicle) positioned in front of the vehicle having the photographing apparatus 10 and passes through the light transmission portion 85a of the front window 85, the light transmission hole 86b of the light shielding sheet 86, and the lens 32a, to generate imaging data. The camera unit 30 processes imaging data, and transmits it to the control device 100 each time a predetermined time period elapses. By analyzing the received imaging data, the control device 100 acquires information (forward information) on an object (other vehicle, obstacle, etc.) existing in front of the vehicle, and controls the vehicle based on the forward information.

For example, based on the forward information, the control device 100 executes "automatic brake control, lane keeping assist control (i.e., lane tracing assist control), adaptive high beam control" and the like, executes automatic operation, and issues an alarm. Hereinafter, such a control based on forward information is referred to as driving support control.

Furthermore, when the ignition switch is closed, the detection operation of the outside air temperature sensor 101 is repeatedly executed each time a predetermined time period elapses while the engine is operating. The outside air temperature sensor 101 continuously transmits a signal related to the detection result to the control device 100 while the engine is operating.

Meanwhile, when the outside air temperature (i.e., air temperature outside of the vehicle) is low, dew condensation may occur on the light transmission portion 85a of the front window 85. Dew condensation is easy to occur when an air heating device is used in the passenger compartment. Furthermore, when the outside air temperature is low, ice and/or frost may adhere to the light transmission portion 85a. If such a phenomenon occurs, the imaging data generated by the image pickup device 32b may be data representing a blurred object image, and/or the image pickup unit 32 may fail to image an object in front of the vehicle. In such a case, the control device 100 may fail to accurately perform the above-described driving support control using imaging data.

Therefore, when air temperature detected by the outside aft temperature sensor 101 becomes equal to or lower than a preset temperature, the control device 100 repeats a switching operation. In this switching operation, the control device 100 switches the switch element 89, which was in the OFF state, to the ON state for a predetermined time period, and thereafter switches the switch element 89 to the OFF state for a predetermined time period. When the switch element 89 is set to the ON state, electricity of the IG electric power source is supplied to an electrical circuit shown in FIG. 9. Then, the electricity is supplied to the heater 43*b* made of the heating wire, so that the heater 43*b* generates heat.

The both end portions of the heater 43*b* are constituted by the pair of lands 43*c*, 43*d*, which are formed in the supported portion 43*a*2 and have widths broader than the body portion 43*b*1 (i.e., each of the lands 43*c*, 43*d* has an area per unit length which is larger than that of the body portion 43*b*1). Therefore, when electric power is supplied to the heater 43*b*, the lands 43*c*, 43*d* generate a small amount of heat, however, this amount of heat per unit time is smaller than that of the body portion 43*b*1. In other words, the amount of heat generated by the body portion 43*b*1 per unit time is larger than the lands 43*c*, 43*d*. In this embodiment, the body portion 43*b*1 faces the heated portion 41*a* in the thickness direction of the heated portion 41*a*. In other words, when viewed in the thickness direction of the heated portion 41*a*, the body portion 43*b*1 is positioned on the inner peripheral side with respect to the outer peripheral edge portion of the heated portion 41*a* while the lands 43*c*, 43*d* are not positioned on this inner peripheral side. Therefore, when the heater 43*b* is formed on the PET sheet 43*a* so that the body portion 43*b*1 is uniformly (evenly) positioned in the entire region of the heated portion 41*a* when viewed in the thickness direction of the heated portion 41*a*, the entire heated portion 41*a* uniformly (evenly) generates radiation heat.

As described above, the thermal conductivity of the heat insulator 45 is lower than those of the light shielding hood 41, the PET sheet 43*a*, the double-faced adhesive tape 42, and the double-faced adhesive tape 44*a*. Therefore, the heat generated by the heater 43*b* is highly unlikely to flow out of the heat insulator 45 from the lower surface and the peripheral surface of the heat insulator 45. Therefore, most of the heat generated by the heater 43*b* is efficiently transmitted from the heater 43*b* to the lower surface of the heated portion 41*a* via the double-faced adhesive tape 42, and further is transmitted to the entire heated portion 41*a*.

As a result, radiation heat emitted from the upper surface (front surface) of the heated portion 41*a* is substantially uniformly transmitted to the entire light transmission portion 85*a*, and dew condensation and the like on the light transmission portion 85*a* are removed by the radiation heat. As a result, the possibility of occurrence of dew condensation on the light transmission portion 85*a* and the possibility of adhesion of ice and frost etc. to the light transmission portion 85*a* are reduced.

In the case where the electrical circuit does not include the fuse 44*b*, when a short circuit (ground fault) occurs in the electrical circuit in the "short circuit" manner of FIG. 10, electricity of the IG electric power source is supplied to the heater 43*b* even when the control device 100 sets the switch element 89 to the OFF state. That is, in this case, the electricity of the IG electric power source is continuously supplied to the heater 43*b* for a long time. Therefore, the heater 43*b*, the heated portion 41*a*, and the peripheral portion thereof become excessively hot.

However, the photographing apparatus 10 of the present embodiment is provided with the fuse 44*b* provided on the electrical circuit. The soluble metal of the fuse 44*b* is heated by the heat transmitted from the heater 43*b* via the lead wires 44*c*, 44*d* and the heat transmitted from the heated portion 41*a*.

When a short circuit occurs in the electrical circuit in the "short circuit" manner in FIG. 10, the heater 43*b* and the heated portion 41*a* become high temperature. Then, the temperature of the fuse 44*b* becomes a temperature equal to or more than a predetermined value, and thus the fuse 44*b* is blown (melted). Then, since the electricity of the IG electric power source fails to be supplied to the heater 43*b*, the heater 43*b*, the heated portion 41*a*, and the peripheral portion thereof are prevented from becoming excessively hot.

Although the present invention has been described based on embodiment, the present invention is not limited to the above-described embodiment, and various modifications can be made without departing from the object of the present invention.

The supported portion 43*a*2 may be provided in the PET sheet 43*a* so as to be located at position different from the position of the supported portion 43*a*2 which was described above. For example, the supported portion 43*a*2 may be connected to the right side edge portion of the body portion 43*a*1. In this case, the support portion 42*a*2 of the double-faced adhesive tape 42 is connected to the right side edge portion of the body portion 42*a*1. Further, when viewed in the thickness direction of the heated portion 41*a*, the support portion 42*a*2 and the supported portion 43*a*2 are located on the right side with respect to the heated portion 41*a*.

Figure 11:
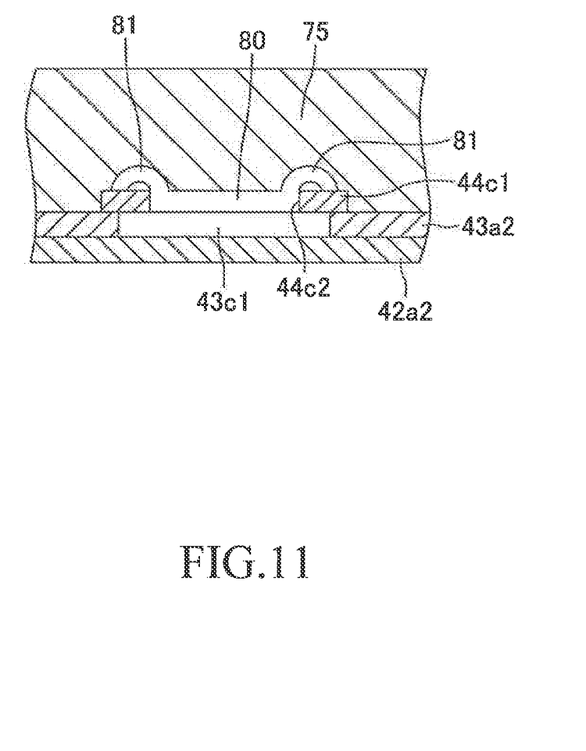
FIG. 11 is a cross-sectional view of a modified embodiment of the present invention which corresponds to FIG. 9.

For example, as shown in FIG. 11, instead of the solders 71, 72, 73 and the solder for the connecting portion 43*d*1, a caulking member 80 may be fixed to the lower surface of the connecting portion 43*c*1 of the supported portion 43*a*2. The caulking member 80 is made from metal (conductive material). Further, the caulking member 80 includes caulked portions 81. Further, a through hole 44*c*2 is formed in the connecting end 44*c*1 of the lead wire 44*c*, and the caulking member 80 passes through the through hole 44*c*2 By caulking the caulked portions 81 against the connecting end 44*c*1, the connecting end 44*c*1 is brought into contact with the connecting portion 43*c*1. Although not shown in the drawing, caulking members 80 are also fixed to the lower surfaces of the connecting portions 43*d*1, 43*e*1, 43*e*2. Then, by the caulking members 80, the connecting end 44*d*1 of the lead wire 44*d* is brought into contact with the lower surface of the connecting portion 43*e*1, the end portion of the electric wire 61 of the first electric cable 60 is brought into contact with the lower surface of the connecting portion 43*e*2, and the end portion of the electric wire 84 of the second electric cable 63 is brought into contact with the lower surface of the connecting portion 43*d*1. Furthermore, also in this modified embodiment, the sealant 75 is fixed to the lower surface of the supported portion 43*a*2 so as to cover the connecting portions 43*c*1, 43*d*1, 43*e*1, 43*e*2, the connecting ends 44*c*1, 44*d*1, the electric wires 61, 64 and the caulking members 80.

The photographing apparatus for the vehicle may be mounted to a window different from a front window. For example, a photographing apparatus for vehicle may be mounted to a back window of a vehicle so that an obstacle located behind the vehicle can be detected by this photographing apparatus for vehicle.

What is claimed is:
1. A photographing apparatus for vehicle comprising:
 a photographing apparatus that is disposed inside a vehicle so as to face a window of the vehicle and is configured to receive photographing light passing through the window;

a heater module disposed inside the vehicle and includes a sheet and a heater configured to generate heat when receiving electricity from an electric power source;

a heated portion which faces the window, the heated portion releasing radiation heat to the window when receiving heat from the heater; and a pair of electrical supply lines for supplying the electricity from the electric power source to the heater, wherein, the sheet includes a body portion having a same shape as the heated portion and a supported portion projecting from a side edge of the body portion, the heater includes a heater-body portion formed on the body portion of the sheet by printing and end portions formed on the supported portion of the sheet by printing, each of the end portions having a width broader than a width of the heater-body portion of the heater so that an amount of heat generated by the both end portions per unit time is smaller than an amount of heat generated by the heater-body portion of the heater per unit time, and wherein, the heater is fixed to the heated portion in such a manner that the body portion of the sheet overlaps the heated portion and the both end portions of the heater are positioned outside of the heated portion when viewed in a thickness direction of the sheet, and the both end portions of the heater are connected to the electrical supply lines respectively, by one of solder and a caulking member, within the supported portion of the sheet.

2. A heating device disposed inside a vehicle so as to face a window of the vehicle together with a photographing apparatus, the heating device comprising:

a heater module includes a sheet and a heater, said heater a heating wire for generating heat when receiving electricity from an electric power source;

a heated portion to which the heater is fixed, the heated portion releasing radiation heat to an area surrounding the heated portion when receiving heat from the heater; and a pair of electrical supply lines for supplying the electricity from the electric power source to the heater, wherein, the sheet includes a body portion having a same shape as the heated portion and a supported portion projecting from a side edge of the body portion, the heater includes a heater-body portion formed on the body portion of the sheet by printing and end portions formed on the supported portion of the sheet by printing, each of the end portions having a width broader than a width of the heater-body portion of the heater so that an amount of heat generated by the both end portions per unit time is smaller than an amount of heat generated by the heater-body portion of the heater per unit time, and wherein, the heater is fixed to the heated portion in such a manner that the body portion of the sheet overlaps the heated portion and the both end portions of the heater are positioned outside of the heated portion when viewed in a thickness direction of the sheet, and the both end portions of the heater are connected to the electrical supply lines respectively, by one of solder and a caulking member, within the support portion of the sheet.

* * * * *